United States Patent [19]

Ganster et al.

[11] Patent Number: 4,576,970

[45] Date of Patent: Mar. 18, 1986

[54] PROCESS FOR THE PRODUCTION OF MOLDED ARTICLES HAVING INTEGRAL SKIN

[75] Inventors: Otto Ganster, Leverkusen; Ulrich Knipp, Bergisch-Gladbach; Bruno Luckas, Leverkusen, all of Fed. Rep. of Germany

[73] Assignee: Bayer Aktiengesellschaft, Leverkusen, Fed. Rep. of Germany

[21] Appl. No.: 703,844

[22] Filed: Feb. 21, 1985

[30] Foreign Application Priority Data

Mar. 3, 1984 [DE] Fed. Rep. of Germany ....... 3407931

[51] Int. Cl.$^4$ .................... C08G 18/14; C08G 18/79
[52] U.S. Cl. .................................. 521/51; 264/45.5; 264/328.6; 428/318.8
[58] Field of Search ............. 521/51; 264/45.5, 328.6; 428/318.8

[56] References Cited

U.S. PATENT DOCUMENTS

| | | | |
|---|---|---|---|
| 4,065,410 | 12/1977 | Schaefer et al. | 260/2.5 |
| 4,218,543 | 8/1980 | Weber et al. | 521/51 |
| 4,272,618 | 6/1981 | Dominguez et al. | 521/160 |
| 4,292,411 | 9/1981 | Jourquin et al. | 521/51 |
| 4,314,038 | 2/1982 | Markova | 521/167 |
| 4,416,844 | 11/1983 | Wyman | 264/267 |
| 4,444,704 | 4/1984 | Hira et al. | 264/45.5 |
| 4,474,901 | 10/1984 | Dominguez | 521/163 |

FOREIGN PATENT DOCUMENTS 3147736 6/1983 Fed. Rep. of Germany .

OTHER PUBLICATIONS

Kunststoff Handbuch, vol. VII, "Polyurethane", Carl Hanser Verlag, Munich (1966), pp. 440 et seq.
Kunststoff Handbuch, pp. 270–271.

Primary Examiner—Herbert S. Cockeram
Attorney, Agent, or Firm—Gene Harsh; Joseph C. Gil

[57] ABSTRACT

The present invention is directed to a process for the production of a molded article having a compact surface layer and a gross density above 900 kg/m$^3$ via the reaction injection molding technique, comprising introducing a reaction mixture into a closed mold, said reaction mixture comprising:

(a) a polyisocyanate component consisting of at least one polyisocyanate in which all the isocyanate groups are aromatically bound,
(b) compounds having molecular weights of from 400 to 12,000 and having at least two isocyanate reactive hydrogen atoms,
(c) water, in a quantity of at least 0.15 mol per mol of isocyanate groups of component (a), and
(d) optionally compounds having molecular weights of from 60 to 399 and having at least two isocyanate reactive hydrogen atoms, wherein the isocyanate index, based on all the reactants taking part in the reaction is from 70 to 125, and wherein a pressure of above 40 bar is maintained in the reaction mixture during the reaction so that the carbon dioxide formed in the course of the reaction remains completely or predominantly in solution in the reaction mixture and in the molded article produced.

3 Claims, No Drawings

PROCESS FOR THE PRODUCTION OF MOLDED ARTICLES HAVING INTEGRAL SKIN

BACKGROUND OF THE INVENTION

The present invention relates to a new process for the production of molded articles having gross densities above 900 kg/m³. In this process, the urea groups required for obtaining the superior mechanical properties are produced mainly by the reaction of aromatic polyisocyanates with aromatic amines which are obtained in situ from aromatic polyisocyanates and water.

It is known to produce molded articles from polyurethanes containing urea groups by reacting a reaction mixture of aromatic polyisocyanates, relatively high molecular weight polyhydroxyl compounds and aromatic diamines containing primary or secondary amino groups in closed molds using the reaction injection molding technique (see U.S. Pat. No. 4,218,543 or German Offenlegungsschrift No. 3,147,736). The molded articles obtained by this method have excellent mechanical properties due to their high urea group content. In the known art processes, the urea groups (which are necessary for obtaining these mechanical properties), are incorporated in the polyurethane structure by using aromatic diamines. In the known art processes, however, the above-mentioned advantage of the excellent mechanical properties is obtained at the expense of having to use expensive, special aromatic diamines, such as 1-methyl-3,5-diethyl-2,4-diaminobenzene or mixtures thereof with 1-methyl-3,5-diethyl-2,6-diaminobenzene. These diamines react very vigorously with aromatically bound isocyanate groups, with the result that the highly reactive reaction mixtures of the known art must be introduced into the molds within a very short time. For filling large molds, this can only be achieved by using special, high power dosing apparatus.

It was therefore an object of the present invention to provide a new process for the production of molded articles based on polyisocyanates having a gross density above 900 kg/m³ (DIN 53 420), in which the use of such generally expensive aromatic diamines is either no longer necessary or in comparatively very minor quantities, so that the advantages of the known art processes can be obtained without the abovementioned disadvantages.

DESCRIPTION OF THE INVENTION

The above problems were solved by the process according to the present invention. The basic principle underlying the process according to the invention is that the amino groups required for producing urea groups are obtained in situ by the reaction of part of the isocyanate groups of the polyisocyanate component with water. At the same time, the formation of foam structures is prevented by the maintenance of an external pressure.

The production of polyurethanes containing urea groups by the reaction of organic polyisocyanates with organic polyhydroxyl compounds in the presence of water is already known. In the known processes, the water has been used mainly or exclusively for the reaction of isocyanate groups with water to produce carbon dioxide as blowing agents for the purpose of producing foam structures (see Kunststoff Handbuch, Volume VII "Polyurethane", Carl Hanser Verlag Munich (1966), pages 440 et seq). The production of solid, non-cellular polyurethane elastomers by the two-stage process, using water as chain lengthening agent, is also already known (see Kunststoff Handbuch, pages 270–271), but this method of producing non-cellular elastomers also went through the intermediate stage of producing foam structures which were subsequently compacted on rollers and finally compressed to form solid elastomers.

The process according to the invention, on the other hand, for the first time enables an aqueous reaction mixture to be converted into a virtually unfoamed urea-modified product without the intermediate formation of foams which must subsequently be compressed to form unfoamed polyurethanes. This is achieved according to the invention by exerting such a pressure on the liquid reaction mixture during the reaction that the carbon dioxide formed remains predominately or completely in solution in the reaction mixture and in the resulting product.

This invention more particularly relates to a process for the production of a non-cellular or microcellular molded article having a compact surface layer and a gross density above 900 kg/m³ via the reaction injection molding technique comprising introducing a reaction mixture into a closed mold, said reaction mixture comprising:

(a) a polyisocyanate component consisting of at least one polyisocyanate having only aromatically bound isocyanate groups (b) compounds having molecular weights of 400–12,000 and having at least two isocyanate reactive hydrogen atoms, (c) water in a quantity of at least 0.15 mol per mol of isocyanate groups of component (a)

(d) optionally compounds having molecular weights of 60 to 399 having at least two isocyanate reactive hydrogen atoms, and (e) optionally the usual auxiliary agents and additives.

wherein the isocyanate index, based on all the reactants taking part in the reaction, is from 70 to 125, and wherein a pressure of above 40 bar is maintained in the reaction mixture during the reaction so that the carbon dioxide formed during the reaction remains completely or predominantly in solution in the reaction mixture and in the molded articles obtained therefrom, and wherein the resulting molded articles are removed from the mold aftertermination of the chemical reaction.

The reaction injection molding technique (abbreviated: RIM) is a standard process for the production of molded polyisocyanate-based articles and has been described, for example, in "Reaction Injection Molding" by W. E. Becker, Van Nostrand Reinhold Company, New York, Cincinnati, London, Atlanta, Toronto, Dallas, San Francisco, Melbourne (1979).

The starting materials (a) include any organic polyisocyanates in which all the isocyanate groups are aromatically bound and in particular the technically important aromatic polyisocyanates known from polyurethane chemistry, such as 2,4-diisocyanatotoluene, its commercial mixtures with 2,6-diisocyanatotoluene and polyisocyanates or polyisocyanate mixtures of the diphenyl methane series. The polyisocyanates may be used in their unmodified form or they may be modified with urethane, carbodiimide and/or isocyanurate groups. The "polyisocyanates and polyisocyanate mixtures of the diphenylmethane series" of 4,4'-diisocyanatodiphenyl methane and mixtures thereof with 2,4'- and optionally 2,2'-diisocyanatodiphenyl methane and/or with their higher functional homologues. Mixtures of this kind which alco contain the higher functional homologues may be obtained in known manner by the phosgenation of the corresponding aniline/formaldehyde condensates. Polyisocyanate mixtures of the diphenylmethane series used in the process according to the invention preferably have a difunctional isocyanate content of at least 60% by weight. If used for the production of rigid molded products with exceptionally high impact strength or of elastic molded articles, their difunctional isocyanate content is preferably at least 90% by weight. The polyisocyanates to be used in the process according to the invention are preferably liquid at room temperature. To be included among the particularly preferred polyisocyanates are the reaction products of 1 mol of 4,4'-diisocyanatodiphenyl methane with 0.05 to 0.3 mols of low molecular weight diols or triols, preferably polypropylene glycols having a molecular weight below 700 or carbodiimide-modified (or uretone imine-modified) 4,4'-diisocyanatodiphenyl methane such as those obtainable, for example, according to U.S. Pat. No. 3,152,162. Mixtures of these urethane-modified or carbodiimide-modified diisocyanates with each other or with similarly modified or unmodified 2,4'-diisocyanatodiphenyl methane or with the above-mentioned, similarly modified or unmodified, higher functional homologous polyisocyanates are also particularly preferred. These mixtures may be prepared by suitable modification of mixtures of corresponding starting polyisocyanates or by mixing polyisocyanates which have already been at least partly modified. Isocynate prepolymers and isocyanate semi-prepolymers based on the polyisocyanates exemplified above and on the polyhydroxyl compounds (b) and (d) mentioned below may also be used as polyisocyanate component (a).

Suitable starting components (b) include particular polyester polyols and polyether polyols having molecular weights of from 400 to 12,000, preferably from 900 to 6,000, and mixtures of such compounds. These polyhydroxyl compounds have at least 2, preferably 2 to 6 alcoholic hydroxy groups and are prepared from known starting materials by known methods.

Suitable polyester polyols may be obtained, for example, by the reaction of excess quantities of polyhydric alcohols with polybasic, preferably dibasic carboxylic acids or carboxylic acid anhydrides. Suitable carboxylic acids, carboxylic acid anhydrides and low molecular weight, polyhydric alcohols are, for example, described in U.S. Pat. No. 4,218,543, column 8, lines 27–52.

Polyether polyols suitable for the process according to the invention may be obtained, for example, by the known method of alkoxylating suitable starter molecules, in particular using ethylene oxide and/or propylene oxide, optionally as mixtures or in any sequence. Examples of suitable starter molecules include water, ethylene glycol, 1,2-dihydroxy propane, trimethylol propane and/or glycerol.

In addition to or instead of the above-mentioned polyester polyols and/or polyether polyols, other relatively high molecular weight compounds within the stated molecular weight range and containing isocyanate reactive groups may also be used as component (b) in the process according to the invention. These include, for example, polyesters based on lactone, such as poly-ε-caprolactones, or polyesters based on ω-hydroxyalkane carboxylic acids, such as ω-hydroxy caproic acid, polycarbonate polyols, polyester amides or hydroxyl group-containing polyacetals within the stated molecular weight range. The well-known aminopolyethers within the stated molecular weight range may also be used as compound (b). These "aminopolyethers" are compounds whose isocyanate-reactive groups consist at least partly of primary or secondary amino groups. The manufacture of such "aminopolyethers" is described in numerous publications such as, for example, in German Offenlegungsschrifts Nos. 3,231,399, 2,019,432, 2,619,840, 2,546,536, 2,948,419, 3,039,600 or in U.S. Pat. Nos. 3,654,370, 3,326,895, 3,808,250, 3,975,428, 4,016,143 or 4,218,543. The polyester polyols and polyether polyols mentioned above as examples are preferred.

The low molecular weight compounds (d) having molecular weights of 60 to 399 are optionally also used in the process. These include preferably polyhydric, aliphatic alcohols with molecular weights of 62 to 399, (optionally containing ether groups) such as ethylene glycol, 1,2-dihydroxy-propane, 1,3-dihydroxy propane, 1,4-dihydroxy butane, 1,6-dihydroxy hexane, diethylene glycol, triethylene glycol, dipropylene glycol, tripropylene glycol, trimethylol propane, glycerol, low molecular weight alkoxylation products of the above-mentioned polyhydric alcohols, or mixtures of such low molecular weight chain lengthening agents or cross linking agents. Organic diamines with molecular weights of 60 to 399 having at least 2 primary and/or secondary amino groups may also be used as component (d). Examples include 1,2-diamino ethane, 1,6-diamino hexane, 2,4-diaminotoluene, 4,4'-diaminodiphenyl methane and in particular aromatic diamines with sterically hindered amino groups, which are liquid at room temperature and examples of which are given in German Offenlegungsschrift No. 2,916,485, page 17, line 26 to page 18, line 9. Mixtures of the diamines mentioned there may also be used, if they are liquid at room temperature. Since, however, it was an object underlying this invention to be able to dispense with such amines to a large extent, these would only be used, if at all, in minor quantities of at the most 30 mol %, based on the quantity of water, to act as "viscosity regulators". Since the reaction between isocyanate groups and amino groups begins immediately, these may be used, where required, to increase the viscosity of the liquid reaction mixture before the main reaction begins. This is in many cases advantageous for reasons connected with the apparatus (sealing off the plane of separation, the ejectors and the core drafts).

The auxiliary agents and additives (e) optionally used include, for example, emulsifiers, catalysts, lubricants, internal mold release agents, stabilizers, pulverulent or fibrous reinforcing fillers, flame retarding agents or plasticizers of the type mentioned, for example, in German Offenlegungsschrift No. 3,147,736 or in the Kunststoff Handbuch already referred to above, on pages 96 et seq.

An essential feature of this invention is the use of water as an additional reaction component. In the process according to the invention, water is used in a quantity of at least 0.15 mol, and preferably from 0.25 to 0.49 mole per mol of isocyanate groups present in component (a).

The reactants are otherwise used in quantities corresponding to an isocyanate index of from 70 to 125, preferably from 85 to 115. By "isocyanate index" is meant the number of isocyanate groups present in the reaction mixture per 100 isocyanate reactive groups (water being counted in the calculation as a difunctional compound).

The process according to the invention is carried out by reacting the components by the reaction injection molding technique, preferably combining components (b) to (e) to form a "polyol component" which is combined with polyisocyanate component (a), using the mixing apparatus conventionally used for the reaction injection molding technique, to form the liquid mixture which reacts to yield the urea-modified product. The quantity of component (a) used in this process is generally from 15 to 300% by weight, preferably 35 to 200% by weight, based on the total quantity of components (b), (d) and (e), not counting any inert auxiliary agents and additives used. Isocyanate excesses which are large in terms of weight may be present if isocyanate prepolymers based on the simple polyisocyanates are used as polyisocyanate component (a) and the polyhydroxyl compounds mentioned under (b) and optionally under (d) are used. In all cases, however, the quantity of component (b) is at least 25% by weight, based on the entire reaction mixture, not counting any inert auxiliary agents and additives used. The particulars given above concerning the isocyanate index apply to the individual components such as, that is to say, any polyhydroxyl compounds already built into component (a) are not taken into account when calculating the isocyanate index.

A second essential feature of the invention is that the reaction mixture, which is preferably produced by high pressure injection mixing, is introduced into a liquid-tight tool preferably tempered to a temperature in the region of 30°–70° C., this tool being preferably made of metal, in particular steel. During the reaction, the pressure in this tool is maintained at a level above 40 bar so that the carbon dioxide formed in the course of the reaction remains completely or predominately in solution. Maintaining this pressure is achieved either (a) by application of an external pressure, for example by means of a press (mold closure unit) or (b) by the use of rigid, pressure resistant tools.

The molding tools used are preferably completely filled with the liquid reaction mixture before chemical reaction takes place to any significant extent.

When liquid-tight, pressure resistant molds are used, it is sufficient, for the purpose of generating and maintaining the necessary pressure, to seal the mold tightly after it has been filled.

If the molding tools are of such a nature that the internal pressure produced by the evolution of carbon dioxide causes an increase in their internal volume, the generation and maintenance of the required internal pressure must be ensured by the application of an external pressure. For the production of microcellular molded articles having a gross density only slightly below the density of the corresponding noncellular molded articles but still above 900 kg/m$^3$, the external pressure may be controlled to bring about a controlled change in the internal volume of the molding tool to correspond to the desired density of the molded article. Care must always be taken to ensure that the internal pressure in the tool is sufficient to enable most of the carbon dioxide formed to remain in solution.

Since the viscosity of the fresh reaction mixture may sometimes be very low and the molding tool can in many cases only be sealed off by very elaborate measures, it is frequently advisable not to apply the external pressure until the viscosity has already risen as a result of the reaction having already begun. This time delay in the application of pressure may be realized technically by, for example, using so called immersion edge tools with corresponding presses or by employing the after pressurization method. Suitable immersion edge tools are known and have been described, for example, in "Kunststoff Handbuch", Carl-Hanser-Verlag, Munich (1973), Volume 8, "Polyester" on page 488. Apparatus suitable for the so called after pressurization method have been described, for example, in European Pat. No. 0 024 610.

The condition required by the invention, that the carbon dioxide formed must remain completely or predominately in solution means that in the case of a non-cellular or only slightly micro-cellular structure (gross density at least 1050 kg/m$^3$), the final products must contain, in solution, at least 70% by weight, preferably at least 85% by weight of the carbon dioxide calculated to be theoretically obtainable from the quantity of water put into the process. The theoretically obtainable quantity of carbon dioxide calculated corresponds to the quantity of water put into the process if the isocyanate index is at least 100, i.e., 1 mol of carbon dioxide is formed per mol of water put into the process. For isocyanate indexes below 100, it is assumed, when calculating the theoretically obtainable quantity of carbon dioxide, that the molar quantity of carbon dioxide formed corresponds, as a first approximation, to the number of mols of water put into the process multiplied by the isocyanate index and divided by 100. When producing molded articles having gross densities of from 900 to 1050, it may also be assumed that more than 50% by weight of the theoretical quantity of carbon dioxide is dissolved in the molded article since even when the gross density is only 900 kg/m$^3$ (assuming that the density of the corresponding unfoamed article is 1100 kg/m$^3$), the gas volume of the pores is only 22%, based on the total volume of the molded article. On the assumption that the gas present in the pores is not under excess pressure, this would mean that in a molded article having a density of 900 kg/m$^3$, 220 cm$^3$ of carbon dioxide, corresponding to 0.01 mol of water, are present per 1000 cm$^3$ of volume. In fact, however, the quantity of water used in the process according to the invention is generally more than 0.30 mol of water per 900 g of reaction mixture. Even if the pressure of carbon dioxide in the pores were 10 bar (which would be sufficient to cause deformation or even bursting of the molded article), the pores would only contain 0.1 mol of carbon dioxide per 900 g, i.e., less than one third of the quantity calculated from the quantity of water put into the process.

The internal pressure required in the molding tool for the process according to the invention is generally within the range of from 40 to 180 bar, preferably from 80 to 150 bar. When the quantity of water used is less than 2.5% by weight, based on the total reaction mixture, a pressure of 40 to 120 bar is generally sufficient. When larger quantities of water are used, a pressure above 120 bar may be necessary.

If the cavity of the molding tool is completely filled and the molding tools used have a constant internal volume, the molded articles obtained by the process according to the invention are non-cellular. If controlled increase in the internal volume of the molding tool is effected during the chemical reaction (for example, by a slight outward movement of the mold core or of a part thereof from the cavity of the mold, which can be controlled by the closing force applied by the closure cover) or if a slight increase in the internal volume of the mold occurs due to the elastic deformability of the molding tool, the products obtained are micro-cellular articles, but they always have a non-cellular surface layer.

The same results may in principle be obtained by only partly filling a pressure stable mold having a constant internal volume. As already mentioned above, however, for the process according to the invention, the molds are preferably completely filled with the liquid reaction mixture before the chemical reaction sets in. In all variations of the process, whether using molding tools having a variable internal volume or whether only partly filling the mold, it is always necessary to ensure that the molded product obtained have a gross density (DIN 53 420) above 900 kg/m$^3$, preferably above 1050 kg/m$^3$.

It is extremely surprising that the molded articles, containing such large quantities of carbon dioxide, can be removed from their mold very rapidly without tearing, blistering or undergoing any deformation due to the sudden release of pressure. The molded articles may generally be removed after they have been left in the mold for 2 to 5 minutes at 30° to 70° C., preferably 50° to 60° C.

When the molded products released from their molds are stored at room temperature, the carbon dioxide dissolved in them is gradually released by diffusion. After about 12 hours storage at room temperature, about 60% of the carbon dioxide originally dissolved in the products has disappeared. After this time, the molded articles may be heated, e.g. to 120° C., without tearing or blistering. When large quantities of water and high isocyanate indexes are used and correspondingly large quantities of carbon dioxide are dissolved in the molded articles, heating of the molded articles to 120°-150° C. may result in tearing even after 12 hours storage at room temperature. This formation of cracks may be avoided by heating step-wise. The fact that this finding is observed to an equal extent in non-cellular as in micro-cellular molded articles according to the invention proves that the sharp increase in internal pressure in the "fresh" molded articles when heated, resulting in "bursting" of the molded articles, is almost due entirely to the rapid conversion of dissolved carbon dioxide into gaseous carbon dioxide with corresponding increase in pressure is not due to the comparatively low gas pressure of the gaseous carbon dioxide present in comparatively small quantities in the pores of the micro-cellular articles.

The molded articles obtained in the process according to the invention have a density above 900 kg/m$^3$, preferably a density of from 1050 to 1200 kg/m$^3$. The density may exceed 1200 kg/m$^3$ if the reaction mixtures contain a high proportion of high density fillers. The molded articles always have a compact, i.e. non-cellular surface layer. Exceptionally homogeneous molded articles which are free from any pits, bubbles or surface porosities are obtained if the principle of the process according to the invention is combined with the after pressurization technique described in European Pat. No. 00 24 610, i.e., if the process according to the invention is carried out in molding tools of the type described in the said prior publication.

The process according to the invention enables high quality molded products to be obtained within a very wide range of hardness, from about 65 Shore A (elastomers) to at least 80 Shore D. Preferably, the starting materials i.e. their molecular weight and their functionality as well as the amount of water are selected so that the resulting moldings exhibit a hardness of at least about 70 Shore A, more preferably of at least 40 to 80 Shore D.

The special advantage of the process according to the invention is to be seen in that it enables substantially non-cellular, solid urea-modified polyurethanes to be produced with the aid of a toxicologically completely harmless chain lengthening agent (water), and that these polyurethanes are entirely equal in their excellent mechanical properties to the corresponding amine-lengthened polyurethanes known in the art and can be produced entirely or almost entirely without the use of diamine chain lengthening agents. Another advantage of the reactive systems used according to the invention compared with the systems known in the art, (which contain highly reactive aromatic diamines as chain lengthening agents), is the prolonged flow time of the reaction mixtures used according to the invention, which enables the mixtures to be easily introduced even into large molds with complicated forms before the chemical reaction leading to formation of the polyurethane begins.

The products of the process according to the invention may be used in many different fields of application, e.g., as wear-resistant linings, screen plates, filter plates, technical driving and transmission parts, seals, bellows, tires, cylinders, rollers, bearing elements, shoe soles, heels, boots, shock-absorbers, buffers, body parts for motor vehicles, containers, trunks, housings and molded parts for computers, copying machines, television apparatus, teleprinters, electrical apparatus, air conditioning apparatus, household appliances and refrigerators, cable junction boxes, skis and similar articles of daily use.

The invention if further illustrated, but is not intended to be limited by the following examples in which all parts and percentages are by weight unless otherwise specified.

EXAMPLES

The following raw materials were used in the following examples:

Component (a):

Polyisocyanate I:

Polyisocyanate mixture of the diphenyl methane series prepared by the phosgenation of an aniline/formaldehyde condensate, having an isocyanate content of 31.5% and a viscosity at 25° C. of 100 mPa.s.

Polyisocyanate II:

Reaction product of a polyisocyanate mixture of the diphenyl methane series containing 90% of diisocyanatodiphenyl methane isomers with tripropylene glycol. Isocyanate content: 24.6%.

Polyisocyanate III:

Isocyanate semiprepolymer having an isocyanate content of 19.5%, prepared by the reaction of 4,4'-diisocyanatodiphenyl methane with a polyester diol having a molecular weight of 2000 obtained from adipic acid and a mixture of ethylene glycol and butanediol in proportions by weight of 70:30.

Polyisocyanate IV:

2,4-diisocyanatotoluene.

Component (b):

Polyol I:

Polyether polyol with OH number 28 prepared by the propoxylation of sorbitol and ethoxylation of the propoxylation product (proportions by weight of PO:EO=83:17).

Polyol II:

Polyether polyol with OH number 28 prepared by the propoxylation of trimethylol propane followed by ethoxylation of the propoxylation products (proportions by weight of PO:EO=78:22).

Polyol III:

Polyester diol with OH number 56 prepared by the reaction of adipic acid with a mixture of 1,4-dihydroxy butane and ethylene glycol in proportions by weight of 50:50.

Component (c):

Chain lengthening agent I:

Mixture of 70% of 2,4-diamino-3,5-diethyltoluene and 30% of 2,6-diamino-3,5-diethyl-toluene.

Chain lengthening agent II:

Propoxylation product of ethylene diamine, OH number 800.

Component (d):

Additive I:

Commercial polyether polysiloxane stabilizer ("Stabilizer OS 50" of Bayer AG, Leverkusen).

Additive II:

Salt containing amide groups, obtained from 2 mols of oleic acid and 1 mol of N-dimethylamino-propylamine. This additive fulfills the double function of an emulsifier and an internal mold release agent.

General description of experimental method

The materials were processed on commercial high pressure dosing and mixing apparatus. Components (b) to (e) were mixed together to form a polyol mixture, as is customary in the preparation of polyurethane foam. The temperature of the raw materials during processing was about 35° C. with the exception of Example 11, where the polyol mixture and isocyanate were preheated to 50°-55° C.

Molding Tools:

Plate mold having the internal dimensions, 50×80×0.45 cm, the internal surfaces of which had been coated with a commercial external mold release agent based on wax (Acmosil 180 of Acmos, Bremen). The tool was an oil tempered immersion edge tool of steel.

The tool was maintained at a temperature of 50°-60° C. (surface temperature) during the experiments. Mixing Head MQ 18/4K of Fa. Hennecke, Birlinghoven.

Measurement of internal pressure of tool:

Pressure receiver (P3M/200; manufacturer: Fa. Hottinger, Darmstadt) at the center of the plate.

Determination of $CO_2$ loss:

The carbon dioxide loss was determined by weighing the molded article (a) directly after its removal from the mold and (b) after 12 hours storage at room temperature followed by tempering at 120° C. for 60 minutes.

Closure mechanism:

A commercial press (Model: 300K400PO) of Firma. Paul Ott, Waibling-Neustadt, having a closing force of 400 t was used.

General remarks:

Examples 1 to 6 and Example 7 are examples illustrating the cross linking action of water at different quantites of water and using different types of polyisocyanates of the diphenyl methane series.

Examples 6A to 6D and 7A to 7C show the possible variations in the isocyanate index. Example 6C is a comparison example (index=135) showing that at this isocyanate index, unacceptable mold release times are required because hardening proceeds too slowly. As may be seen from the examples, the molded articles produced with an isocyanate index below 100 have significantly lower hardnesses.

Example 8 is similar to Example 7 apart from polyisocyanate component (a).

Examples 9 and 10 illustrate the cross linking with water with concomitant use of about 30 mol %, based on the quantity of water, of an aromatic diamine as chain lengthening agent.

Examples 11 and 12 illustrate the production of comparatively flexible elastomers.

The nature and quantitative proportions of the starting materials used in the examples and the analytical data and test results found are summarized in the following Tables 1 and 2. The figures given in Table 1 relating to the formulations denote parts by weight unless otherwise indicated.

TABLE 1

| Example No. | 1 | 2 | 3 | 4 | 5 | 6 | 6A | 6B | 6C | 6D |
|---|---|---|---|---|---|---|---|---|---|---|
| Component b | | | | | | | | | | |
| Polyol I | 80.9 | 80.0 | 78.7 | 77.5 | 77.5 | — | | | | |
| Polyol II | — | — | — | — | — | 85.7 | | | | |
| Polyol III | — | — | — | — | — | — | | | | |
| Component d | | | | | | | | | | |
| Chain Lengthening agent II | 10.5 | 10.4 | 10.2 | 10.1 | 10.1 | — | | | | |
| Chain Lengthening agent I | — | — | — | — | — | 2.22 | | | | |
| Component e | | | | | | | | | | |
| Additive I | 2.10 | 2.08 | 2.04 | 2.01 | 2.01 | 2.22 | | | | |
| Additive II | 3.15 | 3.11 | 3.07 | 3.02 | 3.02 | 3.34 | | | | |
| Triethylene diamine* | 0.63 | 0.62 | 0.61 | 0.60 | 0.60 | 0.67 | | | | |
| Dibutyl tin dilaurate | 0.21 | 0.21 | 0.20 | 0.20 | 0.20 | 0.33 | | | | |
| Propylene carbonate (plasticizer) | — | — | — | — | — | — | | | | |
| Water | 2.45 | 3.63 | 5.11 | 6.55 | 6.55 | 5.56 | | | | |
| Isocyanate Index | 105 | 105 | 105 | 105 | 105 | 105 | 115 | 125 | 135 | 95 |
| Component a | | | | | | | | | | |
| Polyisocyanate I | 66 | 84 | 107 | 130 | — | — | — | — | — | — |
| Polyisocyanate II | — | — | — | — | 164 | 125 | 137 | 149 | 161 | 113 |
| Polyisocyanate III | — | — | — | — | — | — | — | — | — | — |
| Polyisocyanate IV | — | — | — | — | — | — | | | | |
| Water based on total quantity of polymer (% by weight) | 1.48 | 1.97 | 2.47 | 2.85 | 2.48 | 2.47 | 2.35 | 2.23 | 2.13 | 2.61 |

TABLE 1-continued

| Formulations | | | | | | | | | | |
|---|---|---|---|---|---|---|---|---|---|---|
| g of CO₂ (theor., based on 1 kg of polymer) | 36.2 | 48.2 | 60.4 | 69.7 | 60.6 | 60.4 | | | | |
| g of CO₂ (found, based on 1 kg of polymer) | — | — | — | — | — | 52 | | | | |
| CO₂ found in % of the theory | — | — | — | — | — | 8 | | | | |
| Reaction times | | | | | | | | | not re-leasable | |
| Rise/cream times | 12″–37″ | | | | | 13″/45″ | | | | 120″ |
| Molding time | 4′–5′ | | | | | 120″ | 5′ | 5′ | from mold | |
| Max. internal pressure of tool (bar) | 80–100 | 80–100 | 80–100 | 100–120 | 100–120 | 100–120 | 80–100 | 100–120 | 100–120 | 80–100 |

| Example No. | 7 | 7A | 7B | 7C | 8 | 9 | 10 | 11 | 12 |
|---|---|---|---|---|---|---|---|---|---|
| Component b | | | | | | | | | |
| Polyol I | — | | | | | — | | — | — |
| Polyol II | 86.8 | | | | | 78.0 | | — | 94.4 |
| Polyol III | — | | | | | — | | 83.4 | — |
| Component d | | | | | | | | | |
| Chain Lengthening agent II | — | | | | | — | | — | — |
| Chain Lengthening agent I | 2.25 | | | | | 12.2 | | 0.83 | — |
| Component e | | | | | | | | | |
| Additive I | 2.25 | | | | | 2.02 | | 1.67 | 1.91 |
| Additive II | 3.38 | | | | | 3.04 | | — | — |
| Triethylene diamine* | 0.68 | | | | | 0.61 | | 0.50 | 1.91 |
| Dibutyl tin dilaurate | 0.11 | | | | | 0.10 | | 0.08 | 0.29 |
| Propylene carbonate (plasticizer) | — | | | | | — | | 12.50 | — |
| Water | 4.51 | | | | | 4.05 | | 1.04 | 1.27 |
| Isocyanate Index | 105 | 85 | 75 | 70 | 105 | 105 | 105 | 105 | 110 |
| Component a | | | | | | | | | |
| Polyisocyanate I | — | — | — | — | — | — | — | — | — |
| Polyisocyanate II | 104 | 84 | 74 | 64 | — | — | 113 | — | — |
| Polyisocyanate III | — | — | — | — | 130 | 142 | — | 62 | — |
| Polyisocyanate IV | — | — | — | — | — | — | — | — | 20 |
| Water based on total quantity of polymer (% by weight) | 2.21 | 2.45 | 2.59 | 2.75 | 1.96 | 1.67 | 1.90 | 0.64 | 1.08 |
| g of CO₂ (theor., based on 1 kg of polymer) | 54.0 | 50.9 | | | 43.6 | 40.8 | 46.4 | 15.6 | 31.0 |
| g of CO₂ (found, based on 1 kg of polymer) | 47 | 50 | | | 42 | 41 | — | — | — |
| CO₂ found in % of the theory | 87 | 98 | | | 96 | 100 | — | — | — |
| Reaction times | | | | | | | | | |
| Rise/cream times | | | | | 14″/41″ | | | 13″/32″ | 10″/53″ |
| Molding time | 4′–5′ | | | | | | | 5′ | 6′–7′ |
| Max. internal pressure of tool (bar) | 80–100 | 80–100 | 80–100 | 80–100 | 80–100 | 80–100 | 80–100 | 40–80 | 80–100 |

*30% by weight in dipropylene glycol

TABLE 2

| Test results determined on test samples about 4.2 mm in thickness | | | | | | | | | | | |
|---|---|---|---|---|---|---|---|---|---|---|---|
| Example No. | 1 | 2 | 3 | 4 | 5 | 6 | 6A | 6B | 6C | 6D | 7 |
| Gross density, kg/m³ | 1141 | 1155 | 1168 | 1105 | 1077 | 1072 | 1029 | 1055 | — | 1042 | 1138 |
| Hardness | | | | | | | | | | | |
| Shore A | — | — | — | — | — | — | — | — | | — | — |
| Shore D | 60–61 | 65–66 | 69–70 | 72–73 | 77–78 | 73–74 | 73–75 | 75–77 | — | 70–71 | 64–65 |
| 100% modulus | | | | | | | | | | | — |
| 300% modulus | | | | | | | | | | | — |
| Tensile strength | 23.5 | 29.1 | 34.2 | 32.7 | 33.6 | 29.5 | 31.5 | 28.8 | | 27.8 | 27.8 |
| Elongation at break | 45.8 | 48.3 | 33.0 | 22.5 | 35.1 | 65.1 | 65.4 | 52.1 | not releasable from mold | 66.6 | 95.7 |
| Tension-E-modulus | 389 | 503 | 708 | 757 | 1099 | 598 | 782 | 917 | | 508 | 372 |
| Tear propagation resistance | | | | | | | | | | | 37.4 |
| Compression set (24 h/70° C.) | — | — | — | — | — | — | — | — | | — | — |
| Abrasion | — | — | — | — | — | — | — | — | | — | — |
| SAG test | | | | | | | | | | | |
| 250° F. | 4.66 | 3.3 | 0.77 | 0.87 | — | — | — | — | | — | — |
| 160° C. | 18.0 | 10.0 | 3.8 | 2.5 | — | — | — | — | | — | — |
| Flexural strength | 19.6 | 29.2 | 37.0 | 42.5 | 67.1 | 41.2 | — | — | | — | 25.3 |
| Flexural modulus | 299 | 452 | 586 | 655 | 1070 | 631 | — | — | | — | 380 |
| Impact bending test | 38 | 51 | 61 | 66 | not broken | not broken | not broken | not broken | | not broken | — |
| Shear modulus | | | | | | | | | | | |
| 20° C. | 160 | 202 | — | 245 | 415 | 217 | — | — | — | — | 139 |

TABLE 2-continued

Test results determined on test samples about 4.2 mm in thickness

| | | | | | | | | | | |
|---|---|---|---|---|---|---|---|---|---|---|
| 120° C. | 32.5 | 69.3 | — | 123.8 | 123 | 85 | — | — | — | — | 50.4 |
| Tan δ | | | | | | | | | | |
| 20° C. | — | — | — | — | — | — | — | — | | |
| 120° C. | — | — | — | — | — | — | — | — | | |

| Example No. | 7A | 7B | 7C | 8 | 9 | 10 | 11 | 12 | Dim. | DIN |
|---|---|---|---|---|---|---|---|---|---|---|
| Gross density | 1140 | 1140 | 1120 | 1172 | 1157 | 1089 | 1150 | 1150 | kg/m³ | 53420 |
| Hardness | | | | | | | | | | |
| Shore A | — | — | — | 96–97 | — | — | 72 | 94 | — | 53505 |
| Shore D | 53–55 | 44–45 | 38–40 | 43–44 | 50–52 | 69–70 | 22 | 45 | — | 53505 |
| 100% modulus | — | 13.9 | 10.4 | 9.8 | — | — | 2.9* | 17.5* | MPa | 53455 |
| 300% modulus | — | — | — | 13.7 | — | — | 5.0 | — | MPa | |
| Tensile strength | 20.5 | 16.5 | 13.5 | 16.3 | 28.7 | 31.5 | 25.8 | 19.0 | MPa | |
| Elongation at break | 105 | 124 | 133 | 400 | 323 | 69.6 | 686 | 350 | % | |
| Tension-E-Modulus | 197 | — | — | 123 | 217 | 478 | — | — | MPa | |
| Tear propagation resistance | 35.3 | 22.8 | 19.8 | 57.1 | — | — | 21.1 | 25 | kN/m | 53515 |
| Compression set (24 h/70° C.) | — | — | — | — | — | — | — | 45 | % | 53517 |
| Abrasion | — | — | — | 58 | — | — | 47 | 70 | mg | 53516 |
| SAG test | | | | | | | | | | |
| 250° F. | — | | — | — | — | — | — | — | mm | ASTM D3769-7 |
| 160° C. | — | | — | — | — | — | — | — | mm | |
| Flexural strength | 15.9 | | | 7.4 | 10.4 | 30.2 | | — | MPa | 53452 |
| Flexural modulus | 232 | | | 99 | 144 | 483 | | — | MPa | 53452 |
| Impact bending test | — | | — | — | — | — | — | — | kJ/m² | 53421 |
| Shear modulus | | | | | | | | | | |
| 20° C. | 71.5 | — | — | 54.5 | — | — | — | 22 | MPa | 53445 |
| 120° C. | 23.3 | — | — | 26.8 | — | — | — | 27 | MPa | |
| Tan δ | | | | | | | | | | |
| 20° C. | — | — | — | 0.075 | — | — | — | 0.039 | — | |
| 120° C. | — | — | — | 0.056 | — | — | — | 0.019 | — | |

*DIN 53504

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a molded article having a compact surface layer and a gross density above 900 kg/m³ via the reaction injection molding technique, comprising introducing a reaction mixture into a closed mold, said reaction mixture comprising:
   (a) a polyisocyanate component consisting of at least one polyisocyanate in which all the isocyanate groups are aromatically bound,
   (b) compounds having molecular weights of from 400 to 12,000 and having at least two isocyanate reactive hydrogen atoms,
   (c) water, in a quantity of at least 0.15 mol per mol of isocyanate groups of component (a), and
   (d) optionally compounds having molecular weights of from 60 to 399 and having at least two isocyanate reactive hydrogen atoms, wherein the isocyanate index, based on all the reactants taking part in the reaction is from 70 to 125, maintaining a pressure of above 40 bar in the reaction mixture during the reaction so that the carbon dioxide formed in the course of the reaction remains completely or predominately in solution in the reaction mixture and in the molded article produced, and removing the resulting molded articles from the mold after termination of the chemical reaction.

2. The process of claim 1, wherein polyisocyanate component (a) comprises polyisocyanate or polyisocyanate mixtures of the diphenyl methane series which may be modified with urethane, carbodiimide and/or isocyanurate groups.

3. The process of claim 1, wherein compound (b) comprises polyester polyols and/or polyether polyols having molecular weights of from 400 to 12,000.

* * * * *